United States Patent [19]

Petri et al.

[11] Patent Number: 5,064,931
[45] Date of Patent: Nov. 12, 1991

[54] FLAME-RESISTANT POLYCARBONATES CONTAINING UNITS DERIVING FROM HALOGENATED CARBONYL COMPOUNDS IN THEIR POLYMER CHAIN

[75] Inventors: Alberto Petri; Sergio Poggio, both of Milan, Italy

[73] Assignee: Enichem Tecnoresine S.p.A., Palermo, Italy

[21] Appl. No.: 444,683

[22] Filed: Dec. 1, 1989

[30] Foreign Application Priority Data

Dec. 2, 1988 [IT] Italy ................ 22839 A/88

[51] Int. Cl.$^5$ ............................................. C08G 64/10
[52] U.S. Cl. ................................. 528/202; 528/196; 528/203; 528/204
[58] Field of Search ................ 528/202, 203, 204, 196

[56] References Cited

U.S. PATENT DOCUMENTS 4,393,190 7/1983 Tyrell et al. .................... 528/202

*Primary Examiner*—Harold D. Anderson
*Attorney, Agent, or Firm*—Hedman, Gibson, Costigan & Hoare

[57] ABSTRACT

Flame-resistant thermoplastic branched polycarbonates of high molecular weight are prepared from:
(1) a carbonate precursor;
(2) at least one dihydroxyaromatic compound of formula:

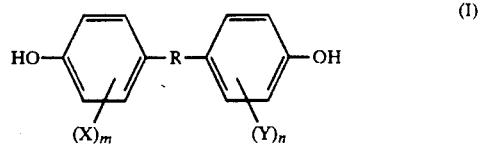

where:
R is a single bond, or a substituted or non-substituted linear or branched $C_1$-$C_5$ alkylene radical, or a group chosen from O, S, $SO_2$ and CO;
X and Y, which may be the same or different, are H or $CH_3$;
m and n, which may be the same or different, are whole numbers from 1 to 4;
(3) at least one halogenated carbonyl compound of formula:

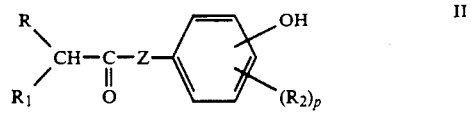

where:
Z is a group chosen from O, S, and NH;
$R_1$ and $R_2$, which may be the same or different, are chlorine or bromine;
R is hydrogen or chlorine or bromine or a $C_1$-$C_3$ alkyl radical;
p is zero or 1 or 2.

9 Claims, No Drawings

FLAME-RESISTANT POLYCARBONATES CONTAINING UNITS DERIVING FROM HALOGENATED CARBONYL COMPOUNDS IN THEIR POLYMER CHAIN

This invention relates to thermoplastic branched polycarbonates of high molecular weight possessing flame-resistant properties (self-extinguishing).

Polycarbonates are known in the art for their excellent physical and mechanical properties such as their high impact strength and their considerable dimensional and thermal stability.

Because of the continually increasing requirement for materials which for safety reasons possess not only excellent mechanical properties but also flame-resistant properties, various methods have been devised in the art for making polycarbonates self-extinguishing.

One of the most commonly used methods is based on introducing halogens, mainly bromine and chlorine, into the polycarbonate.

The halogens can be introduced into the polymer in the form of additives by using generally polyhalogenated organic substances as described for example in U.S. Pat. No. 3,357,942, if desired together with other additives of synergic action such as antimony oxide (J. T. Howarth et al., Plastic World, p. 64–74, March 1973).

It is also known to chemically bond the halogens to the polymer chain by using bifunctional phenols such as tetrabromobisphenol A and tetrachlorobisphenol A as co-monomers in the preparation of the polycarbonate (U.S. Pat. No. 3,334,154).

Halogenated substances of the known art, whether additives or monomers to incorporate in the polymer chain, must however be used in rather large quantities to give the polycarbonate the required self-extinguishing properties.

Although the presence of large halogen quantities in the polycarbonate on the one hand makes the polymer able to resist the flame, on the other hand it leads to degradation of the polycarbonate during its working, to thus cause deterioration in the physical and mechanical properties of the non-halogenated polycarbonate.

Moreover, the high temperatures necessary for working the polycarbonate can cause degradation of the halogenated compounds, with release of hydrohalogen acids and consequent damage to the machines by corrosion.

Thus the technical problem still unsolved is to produce polycarbonates possessing flame-resistant properties which preserve all their inherent chemical, physical and mechanical properties intact.

It has now been found possible to solve said problem by preparing thermoplastic polycarbonates of high molecular weight possessing flame-resistant properties, by using a halogenated carbonyl compound as co-monomer in the preparation of the polycarbonate, said compound being used in small quantities which are in any event less than such as would lead to undesirable changes in the polymer properties.

More particularly, according to the present invention, said thermoplastic polycarbonates of high molecular weight possessing flame-resistant properties are prepared from:
(1) a carbonate precursor;
(2) at least one dihydroxyaromatic compound of formula:

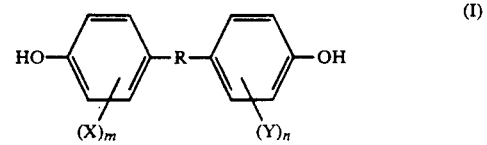

where:
R is a single bond, or a substituted or non-substituted linear or branched $C_1$–$C_5$ alkylene radical, or a group chosen from O, S, $SO_2$ and CO;
X and Y, which may be the same or different, are H or $CH_3$;
m and n, which may be the same or different, are whole numbers from 1 to 4;
(3) at least one halogenated carbonyl compound of formula:

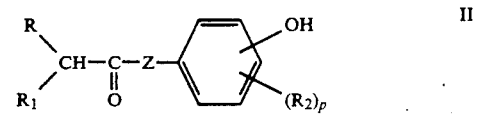

where:
Z is a group chosen from O, S and NH;
$R_1$ and $R_2$, which may be the same or different, are chlorine or bromine;
R is hydrogen or chlorine or bromine or a $C_1$–$C_3$ alkyl radical;
p is zero or 1 or 2.

For said polycarbonates to exhibit flame-resistant properties it is sufficient for the molar ratio of (3) to (2) to be between 0.05/100 and 5/100, and preferably between 0.5/100 and 3/100.

The following are some examples of dihydroxyaromatic compounds (I) which can be used:
4,4'-dihydroxydiphenyl
2,2-bis(4-hydroxyphenyl)propane (bisphenol A)
2,2-bis(3,5-dimethyl-4-hydroxyphenyl)propane;
bis(4-hydroxyphenyl)methane.

In addition to said dihydroxyaromatic compounds, compounds with a single bivalent aromatic ring such as resorcin and hydroquinone can also be used.

The halogenated carbonyl compounds (3) can be prepared using known methods of organic chemistry.

For example, the compounds in which Z is NH can be prepared by reacting the acid chloride of a carboxylic acid of formula

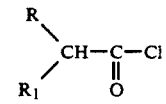

where R and $R_2$ have the aforesaid meaning, with an aromatic amine of formula:

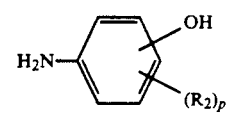

where $R_2$ and p have the aforesaid meaning, by conducting the reaction in an organic solvent such as dioxane or acetone at a temperature of the order of 50°–120°

C. and using a molar amine/acid chloride ratio which is double the stoichiometric so that the evolving hydrochloric acid reacts with the excess amine.

The other halogenated carbonyl compounds can be prepared in similar manner using suitable reactants.

Some examples of halogenated carbonyl compounds suitable for the purposes of the present invention are:
N-(p'-hydroxyphenyl)-2,2-dichloroacetamide;
N-(p-hydroxyphenyl)-2-chloroacetamide;
N-(2'-hydroxy-5'-chlorophenyl)-2,2-dichloroacetamide;
N-(4'-hydroxy-2',6'-dichlorophenyl)-dichloroacetamide;
S-(p-hydroxyphenyl)-2,2-dichlorothioacetate;
S-(p-hydroxyphenyl)-2-chlorothioacetate;
p-hydroxyphenyl-2,2-dichloroacetate;
p-hydroxyphenyl-2-chloroacetate;

The carbonate precursor can be phosgene or a chloroformyl-terminated polycarbonate oligomer (MW between 400 and 2000) prepared by reacting phosgene with a dihydroxyaromatic compound of formula I, or it can be a diaryl, dialkyl or alkylaryl ester of carbonic acid, such as diphenyl carbonate.

The flame-resistant polycarbonates prepared from the aforesaid compounds (1), (2) and (3) have a linear structure. However, the flame-resistant properties can be enhanced if branching is provided in the polycarbonate.

This branching can be obtained by using a polyfunctional organic compound as branching agent in addition to said compounds (1), (2) and (3).

Polyfunctional organic compounds for use as branching agents are compounds known in the art and are characterised by possessing at least three equal or different functional groups chosen from the groups OH, COOH, COCl and SO$_2$Cl.

For example, the branching agents used can be those compounds described in Italian Patent Applications N. 23538 A/84, 20927 A/87 and U.S. Pat. Nos. 4,857,628, 4,789,723, 4,786,707, 4,788,273, 4,798,882 and patent application Ser. Nos. 203,705, 204,425.

The following polyfunctional organic compounds are particularly preferred for the purposes of the present invention:
2,4,6-tris(4'-hydroxyphenyl)amino-s-triazine;
3,7-dihydroxy-$\beta$-naphthoic acid;
1,3,5-trihydroxybenzene;
4,4'-methylenebis(3-hydroxy-2-carboxynaphthalene);
tris(4-hydroxyphenyl)methane;
2,3,4,5-tetrachlorocarbonyltetrahydrofuran;
1,3,6-trichlorosulphonylnaphthalenic acid;

The quantity of branching agent used is such that the the molar ratio of the branching agent to the compound (2) is between 0.01/100 and 5/100.

The flame-resistant polycarbonates of the present invention can be prepared by reacting together in accordance with one of the polymerization methods usually used to produce polycarbonates, (1) a carbonate precursor, (2) a dihydroxyaromatic compound of formula I, (3) a halogenated carbonyl compound of formula II, the molar ratio of (3) to (2) varying from 0.05/100 to 5/100.

The polycarbonates obtained in this manner have a linear structure; if a branched structure is to be obtained, a polyfunctional organic compound as branching agent must be added in a quantity such that the molar ratio of branching agent to compound (2) is between 0.01/100 and 5/100.

One of the polymerization method which can conveniently be used for preparing the polycarbonates of the present invention is interfacial polycondensation. In this method, the dihydroxyaromatic compound (2) and the halogenated carbonyl compound (3) are dissolved in an aqueous sodium hydroxide solution and an organic solvent immiscible with water such as methylene chloride is then added to this mixture.

Phosgene gas is then bubbled through the obtained mixture in the presence of a phase transfer catalyst such as triethylamine, and the reaction is maintained at a temperature of between 15° and 25° C. for a period of between 20 minutes and 6 hours.

According to a preferred embodiment of the present invention, the polycarbonates can be prepared using as carbonate precursors chloroformyl-terminating polycarbonate oligomers, which can be prepared by interfacial reaction between phosgene and a dihydroxyaromatic compound of formula I, in the presence of a molecular weight regulator such as tert.butylphenol.

In practice, said chloroformyl-terminating oligomers, the molecular weight of which varies from 400 to 2000, are dissolved in a water-immiscible organic solvent and are then reacted, again by the interfacial polycondensation method, with compounds (2) and (3) in aqueous alkaline solution, in the presence of a phase transfer catalyst.

As an alternative to interfacial polycondensation, the polycarbonates of the present invention can be prepared by the known method of polycondensation in solution.

In this case, phosgene is bubbled through a solution of methylene and pyridine containing the dihydroxyaromatic compound (2) and the halogenated carbonyl compound (3).

It is also possible to prepare said polycarbonates by transesterification in the molten state, by reacting carbonic acid dialkyl, diaryl or alkylaryl esters as carbonate precursors with the dihydroxyaromatic compound (2) and the halogenated carbonyl compound (3) at a temperature of between 100° and 300° C. in the presence of transesterification catalysts.

The polycarbonates prepared by any of the aforesaid methods have a prevalent molecular weight of between 20,000 and 30,000; they preserve all the inherent characteristics of thermoplastic materials intact. Said polycarbonates can be classified as V-0 in their fire behaviour, evaluated by the UL94 code (underwriters' Laboratories Inc., bulletin S4) and conducted on test pieces of 3.2 mm thickness prepared by compression or injection.

According to said code the materials are classified V-0, V-1 or V-2 based on the results obtained in five tests, in accordance with the following criteria:

V-0: No test piece must show a combustion time exceeding 30 seconds after removal of a bunsen flame. The total combustion time for the five test pieces (ten ignitions) must not exceed 250 seconds. No test piece must allow burning particles to drip and ignite surgical cotton placed vertically under the test piece at a distance of 305 mm.

V-1: No test piece must show a combustion time exceeding 30 seconds after removal of a bunsen flame. The total combustion time for the five test pieces (ten ignitions) must not exceed 250 seconds. No test piece must allow burning particles to drip and ignite surgical cotton placed vertically under the test piece at a distance of 305 mm.

V-2: No test piece must show a combustion time exceeding 30 seconds after removal of a bunsen flame.

The total combustion time for the five test pieces (ten ignitions) must not exceed 250 seconds. The test pieces may allow burning particles to drip and ignite surgical cotton placed vertically under the test piece at a distance of 305 mm.

In addition all five test pieces must pass the test prescribed by UL-94 otherwise they are classified on the basis of the behaviour of the worst test piece. For example, if one test piece shows V-2 behaviour whereas the other four show V-0 behaviour, all five test pieces are classified V-2. Finally, if a test piece continues to burn for more than 30 seconds after removing the bunsen flame, it cannot be classified under UL-94 but instead is indicated as a flammable test piece.

The test pieces are also subjected to a fire-behaviour test in accordance with ASTM D 2863-77 which correlates the flammability of a polymer material with the oxygen concentration of the atmosphere in which the test piece is located. This correlation is expressed by the LOI (limiting oxygen index), i.e. the minimum oxygen percentage able to maintain combustion of the test piece in the oxygen-nitrogen atmosphere which flows about the test piece from the bottom upwards.

The following characteristics were also determined on the polycarbonates of the present invention:

Intrinsic Viscosity ($\eta$)

This property is determined in methylene chloride at 20° C. by an Ubbelhode viscometer and is expressed in dl/g.

Melt Flow Index (MFI)

The melt flow index is evaluated in a melt indexer on an extruded granulate, under a load of 1.2 kg at a temperature of 300° C., in accordance with ASTM D1238.

Impact Strength (IZOD)

This is evaluated on notched test pieces at 0° C. in accordance with ASTM D256.

Shear Sensitivity (SS)

This quantity is evaluated in a melt indexer on an extruded granulate, under loads of 1.2 and 12 kg at a temperature of 300° C., in accordance with ASTM D1238.

The following experimental examples are given for illustrative purposes only and are not to be taken as limitative of the scope of the invention.

EXAMPLE 1

Preparation of
N-(p-hydroxyphenyl)-2,2-dichloroacetamide (in formula II: Z is NH; R and $R_1$ are chlorine; p is zero)

22.7 g (208 mmoles) of p-aminophenol dissolved in 100 ml of dioxane are placed in a 250 ml 4-neck flask fitted with a mechanical stirrer, thermometer and reflux condenser, operating under an inert gas atmosphere.

15.3 g (104 mmoles) of dichloroacetylchloride dissolved in 20 ml of dioxane are added, and the resultant mixture is left for 1 hour at 100° C.

On termination of this period, the precipitated p-aminophenol hydrochloride is filtered off and the resultant solution poured into 4 liters of n-hexane.

The product which precipitates is separated by filtration and dried in an oven under vacuum at 100° C. for 4 hours.

In this manner 21 g of N-(p-hydroxyphenyl)-2,2-dichloroacetamide are obtained with a yield of 92%.

The product had the following characteristics:
Melting point (DSC): 134° C.
Equivalent weight (acidimetric): 217 (theoretical=220)

| | Elementary analysis: | | | |
|---|---|---|---|---|
| | C | H | N | Cl |
| Experimental % | 43.7 | 3.2 | 6.2 | 31.78 |
| Theoretical % | 43.7 | 3.2 | 6.4 | 31.2 |

The product structure was confirmed by NMR spectroscopic analysis.

EXAMPLE 2

84 g of bisphenol A, 65.2 g of sodium hydroxide and 2.4 g of N-(p-hydroxyphenyl)-2,2-dichloroacetamide (3.0 mol % on the bisphenol A) dissolved in 650 ml of water, 20 mg of sodium dithionate (as reducing agent to prevent the formation of coloured by-products) and 6.3 ml of a 0.5N aqueous triethylamine solution are fed under nitrogen into a 3 liter glass reactor temperature-controlled at 25° C.

1300 ml of methylene chloride are then added and 44 g of phosgene gas are bubbled over a time of 30 minutes through the mixture, which is subjected to vigorous stirring.

The reaction proceeds for 2 hours, aqueous sodium hydroxide (20 wt %) being added to keep the pH continuously greater than 11.

The mixture is then diluted with 500 ml of methylene chloride and the organic phase is separated and washed successively with 300 ml of water (twice), 800 ml of 0.15N sodium hydroxide (3 times), 600 ml of water (twice) and 800 ml of 0.1N hydrochloric acid and finally with 600 ml portions of water until neutral.

The polymer is finally recovered by distilling off the organic solvent and is dried and ground to obtain a powder.

The polycarbonate obtained in this manner is then extruded at 260° C. and the extrusion cooled and granulated.

The granules are moulded either by compression (285° C., 40 kg/cm$^2$) or by injection (300° C.) to obtain test pieces of size 127×6.5×3.2 mm.

Five test pieces are subjected to the fire behaviour test described in UL 94. They are found to be V-0, in accordance with the data given in Table 1.

The other polycarbonate characteristics are given in Table 2.

EXAMPLE 3

Example 2 is repeated using the same operating method and reactant quantities, with the exception that 2.7 g of p-tert.butylphenol are added and no halogenated carbonyl compound is used.

The polycarbonate obtained is found to be V-2 at the fire behaviour test, in accordance with UL 94 (see Table 1).

The other polymer characteristics are given in Table 2.

EXAMPLE 4

253.8 g of polycarbonate chloroformyl-terminating oligomers (average molecular weight 681, chloroformyl terminal groups=2758 meq/kg, hydroxyl terminal groups=180 meq/kg) prepared from bisphenol A and phosgene and dissolved in 900 ml of methylene chloride and fed under nitrogen into a glass reactor of 2.5 liters capacity temperature controlled at 25° C.

To the solution, mechanically stirred by a double-anchor device (300 RPM) are then added, in the stated order, 50 ml of water containing 6.2 g of N-(p-hydroxyphenyl)-2,2-dichloroacetamide (equal to 2.4 mol % on the bisphenol A), 1.5 g of caustic soda, 31 mg of sodium dithionate and 7 ml of an aqueous 0.05N triethylamine solution.

After 40 minutes 350 ml of water are added containing 65.9 g of bisphenol A, 24.0 g of caustic soda and 31 mg of sodium dithionate.

115 ml of a 20 wt % aqueous caustic soda solution are then added over a period of 10 minutes using a metering pump.

After 3 hours the reaction mixture is poured into 2200 ml of methylene chloride; the organic phase is then separated and washed, in the stated order, with 900 ml of water (twice), 1300 ml of 0.15N aqueous sodium hydroxide (3 times), 900 ml of water (twice) and 1300 ml of 0.1N hydrochloric acid, and finally with 900 ml portions of water until neutral.

The polymer is recovered by distilling off the organic solvent, and is dried and ground to obtain a powder.

The polycarbonate obtained in this manner is then extruded at 260° C. and the extrusion cooled and granulated.

The granules are moulded by injection or compression to obtain test pieces of size 127×6.5×3.2 mm.

Five test pieces are subjected to the fire behaviour test described in UL 94 and are found to be V-0, in accordance with the data given in Table 1.

The other polycarbonate characteristics are given in Table 2.

EXAMPLE 5

Example 4 is repeated using the same operating method and reactant quantities, except that 7.7 g of N-(p-hydroxyphenyl)-2,2-dichloroacetamide (3 mol % on the bisphenol A) are added.

The polycarbonate obtained is found to be V-0 at the fire behaviour test, evaluated in accordance with UL 94.

The test results are given in Table 1.

The other polymer characteristics are given in Table 2.

EXAMPLE 6

Example 5 is repeated using the same operating method and reactant quantities, except that 1.71 g of 2,4,6-tris(4-hydroxyphenyl) amino-s-triazine (equal to 0.36 mol % on the bisphenol A) are also added The polycarbonate obtained is found to be V-0 at the fire behaviour test, evaluated in accordance with UL 94.

The test results are given in Table 1.

The other polycarbonate characteristics are given in Table 2.

EXAMPLE 7

Example 4 is repeated using the same operating method and reactant quantities, except that 5.3 g of p-tert.butylphenol are added and no halogenated carbonyl compound is added.

The polycarbonate obtained is found to be V-2 at the fire behaviour test, evaluated in accordance with UL 94.

The test results are given in Table 1.

The other polycarbonate characteristics are given in Table 2.

TABLE 1

| Ex. | Total combustion time of 5 test pieces (10 ignitions) (seconds) | Maximum combustion time per test piece (2 ignitions) (seconds) | Classification UL-94 |
|---|---|---|---|
| 2 | 35 | 8 | V-0 |
| 3 | 112 | 25 | V-2 |
| 4 | 33 | 10 | V-0 |
| 5 | 23 | 7 | V-0 |
| 6 | 19 | 5 | V-0 |
| 7 | 107 | 23 | V-2 |

TABLE 2

| Ex. | $[\eta]$ 20° C. $CH_2Cl_2$ (dl/g) | LOI % | Impact (IZOD) (J/m) | MFI (300° C.; 1.2 kg) | SS (300° C.; 1.2 & 12 kg) |
|---|---|---|---|---|---|
| 2 | 0.507 | 31 | 783 | 8.5 | 12.8 |
| 3 | 0.518 | 26 | 724 | 8.0 | 13.1 |
| 4 | 0.571 | 31 | 763 | 4.2 | 12.7 |
| 5 | 0.493 | 32 | 721 | 9.0 | 13.3 |
| 6 | 0.551 | 35 | 792 | 5.1 | 23.1 |
| 7 | 0.502 | 27 | 744 | 8.7 | 12.9 |

We claim:

1. A thermoplastic polycarbonate of high molecular weight possessing flame-resistant properties, produced from:

(1) a carbonate precursor;
(2) at least one dihydroxyaromatic compound of formula:

$$HO-\underset{(X)_m}{\underset{|}{\bigcirc}}-R-\underset{(Y)_n}{\underset{|}{\bigcirc}}-OH \qquad (I)$$

where R is a single bond, or R is a substituted or non-substituted linear or branched $C_1$-$C_5$ alkylene radical, or is selected from the group consisting of O, S, $SO_2$ and CO; X and Y, which are the same or different, are H or $CH_3$; m and n, which are the same or different, are whole numbers from 1 to 4;

(3) at least one halogenated carbonyl compound of the formula $$\underset{R_1}{\overset{R}{\diagdown}}CH-\underset{\underset{O}{\|}}{C}-Z-\underset{(R_2)_p}{\underset{|}{\bigcirc}}-OH \qquad II$$

where:

Z is selected from the group consisting of O, S and NH;

$R_1$ and $R_2$, which are the same or different, are chlorine or bromine;

R is hydrogen or chlorine or bromine or a $C_1$-$C_3$ alkyl radical; and p is zero, 1 or 2.

2. A polycarbonate as defined in claim 1, wherein the molar ratio of (3) to (2) is between 0.05/100 and 5/100.

3. A polycarbonate as defined in claim 2, wherein the molar ratio of (3) to (2) is between 0.5/100 and 3/100.

4. A polycarbonate as defined in claim 1, wherein the carbonate precursor is selected from the group consisting of phosgene, chloroformyl-terminating polycarbonate oligomers having a molecular weight of between 400 and 2000, and carbonic acid diaryl, dialkyl and arylalkyl esters.

5. A polycarbonate as defined in claim 1, wherein the dihydroxyaromatic compound (2) is selected from the group consisting of: 4,4'-dihydroxydiphenyl; 2,2-bis(4-hydroxyphenyl)propane; 2,2-bis(3,5-dimethyl-4-hydroxyphenyl)propane; and bis(4-hydroxyphenyl)methane.

6. A polycarbonate as defined in claim 1, wherein the halogenated carbonyl compound (3) is selected from the group consisting of:
N-(p-hydroxyphenyl)-2,2-dichloroacetamide;
N-(p-hydroxyphenyl)-2-chloroacetamide;
N-(2'-hydroxy-5'-chlorophenyl)-2,2-dichloroacetamide;
S-(p-hydroxyphenyl)-2,2-dichlorothioacetate;
S-(p-hydroxyphenyl)-2-chlorothioacetate;
p-hydroxyphenyl-2,2-dichloroacetate; and
p-hydroxyphenyl-2-chloroacetate.

7. A method for preparing a polycarbonate as defined in claim 1, comprising reacting together (1) a carbonate precursor, (2) a dihydroxyaromatic compound of formula (I), and (3) a halogenated carbonyl compound of formula (II), wherein the molar ratio of (3) to (2) varies from 0.05/100 to 5/100.

8. A method as defined in claim 7, wherein the carbonate precursor is selected from the group consisting of phosgene, chloroformyl-terminating polycarbonate oligomers having a molecular weight between 400 and 2000, and carbonic acid diaryl, dialkyl and arylalkyl esters.

9. A method as defined in claim 7, wherein the carbonate precursor is a chloroformyl-terminating polycarbonate oligomer.

* * * * *